(12) United States Patent
Pfister

(10) Patent No.: US 6,550,629 B1
(45) Date of Patent: Apr. 22, 2003

(54) TACKLE BUCKET

(76) Inventor: Michael A. Pfister, 2127 N. 7th St., Sheboygan, WI (US) 53081

( * ) Notice: Subject to any disclaimer, the term of this patent is extended or adjusted under 35 U.S.C. 154(b) by 0 days.

(21) Appl. No.: 10/023,507

(22) Filed: Dec. 20, 2001

(51) Int. Cl.[7] ................................................ B65D 25/04
(52) U.S. Cl. ...................................... 220/507; 220/552
(58) Field of Search ................................ 220/507, 552, 220/528, 529

(56) References Cited

U.S. PATENT DOCUMENTS 4,499,997 A * 2/1985 Swingley, Jr. .............. 206/427

* cited by examiner

Primary Examiner—Stephen Castellano
(74) Attorney, Agent, or Firm—William Nitkin

(57) ABSTRACT

A structure and kit and method of use is disclosed of a plurality of interegaging panels forming a plurality of open-topped compartments, such structure adapted for positioning within a bucket for storage of objects therein.

4 Claims, 3 Drawing Sheets

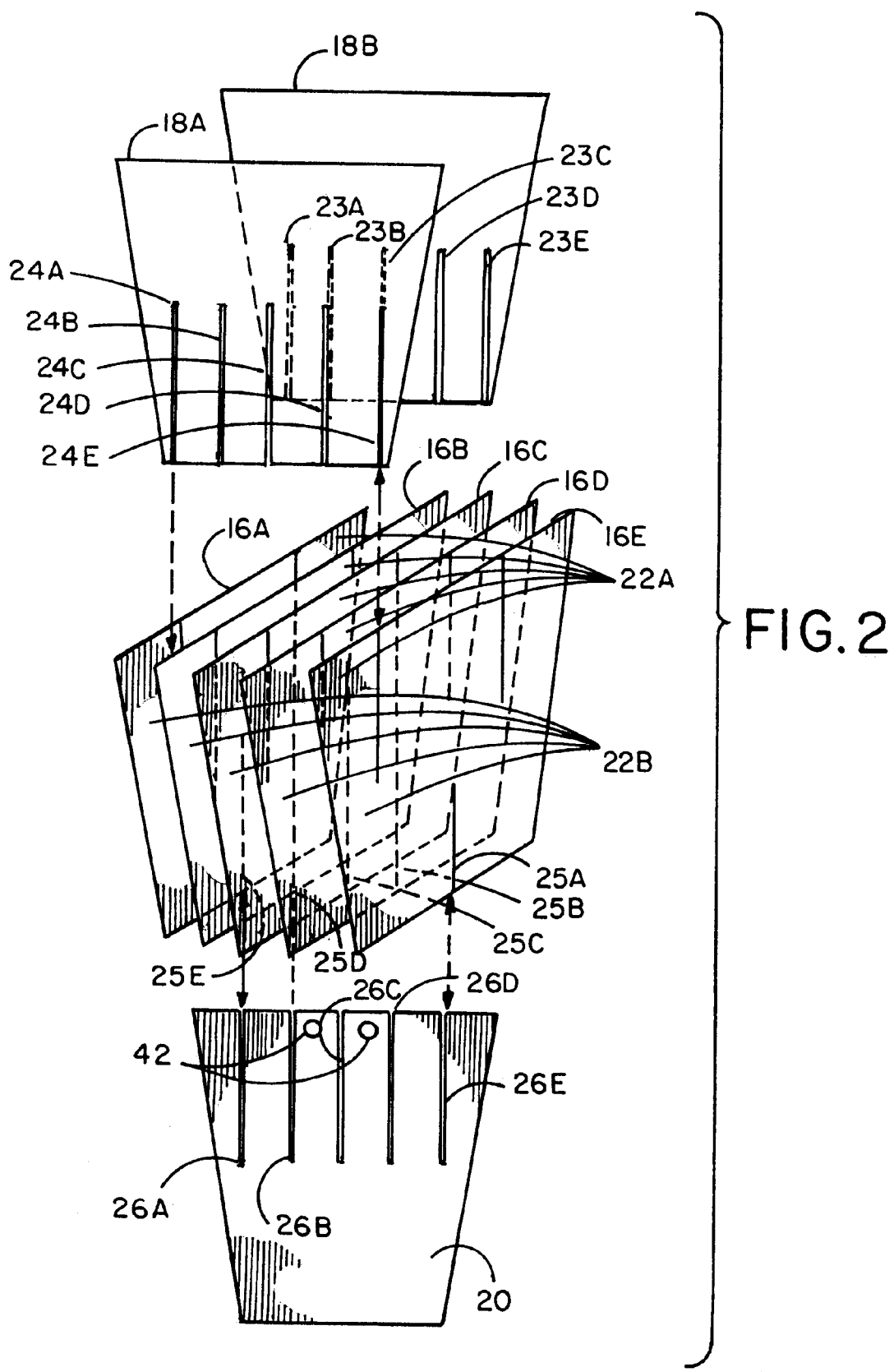

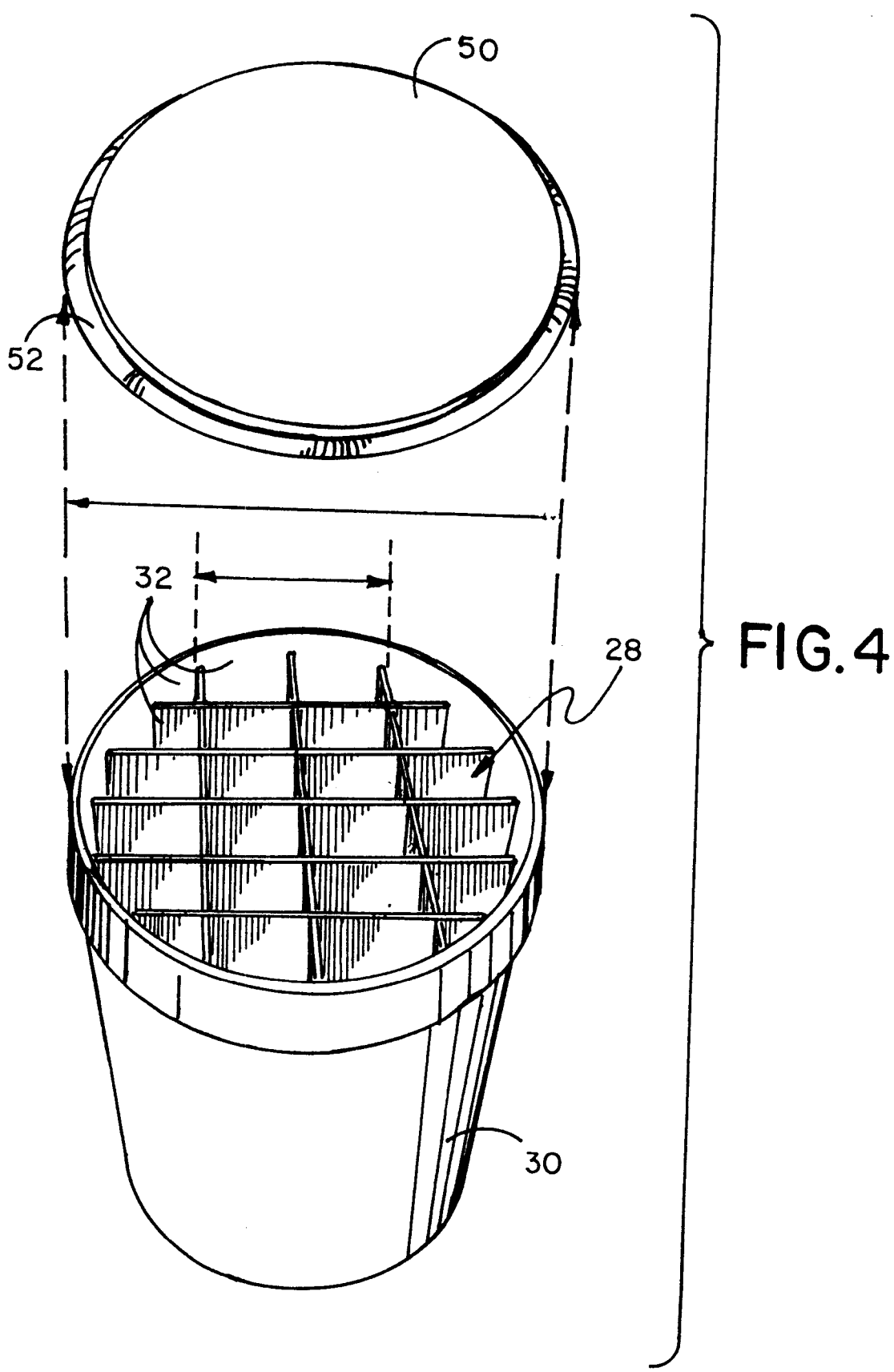

TACKLE BUCKET

BACKGROUND OF THE INVENTION

1. Field of the Invention

The structure, kit and method of use of this invention reside in the area of containers and more particularly relate to a container employing a five gallon bucket having a plurality of interlocking panel inserts engaged with one another therein, provided in the form of a kit, creating a plurality of upward facing openings for receipt of objects such as fishing tackle.

2. History of the Prior Art

Fishing tackle storage boxes are well known in the prior art. Some containers for fishing tackle are very large and expensive, incorporating complex arrangements for the storage of fishing tackle. To reduce costs, fisherman often will reuse 5-gallon buckets which are generally obtainable without cost after their contents have been used for other purposes. Some inventions have been made relating to providing pluralities of trays stacked within such 5-gallon buckets such as taught in U.S. Pat. Nos. 5,154,303 and 5,547,098 to Jordan. In U.S. Pat. No. 5,970,651 to Torkilsen et al it is taught that such a fishing bucket made from a converted utility bucket can have a lid for utilization as a seat.

SUMMARY OF THE INVENTION

It is an object of this invention to provide a structure in a kit form for use of within a typical empty 5-gallon bucket or bucket to create therein a plurality of upwardly facing openings for the receipt therein of larger types of fishing tackle at a very low cost, especially in comparison to the cost of fishing tackle boxes marketed for holding large fishing lures and the like.

It is a further object of this invention that the conversion of a 5-gallon bucket can be accomplished by constructing the panel members as provided in a kit form and inserted into the bucket in a speedy and convenient manner.

It is yet a further object of this invention that such kit can be made of inexpensive materials and sold to fishermen to allow for the reuse and conversion of preexisting 5-gallon containers once their original contents have been used. Such 5-gallon buckets are well known, such as originally containing paint, plaster, oil, food stuffs and the like and are frequently obtainable without charge since they would otherwise be disposed of. However, any type of bucket or pail, even a new, unused one will suffice for the purposes of this invention.

It is a still further object of this invention to disclose a method of use of such structure and kit.

BRIEF DESCRIPTION OF THE DRAWINGS

FIG. 2 illustrates a perspective view of the plurality of panels separated from one another about to be engaged with one another.

FIG. 4 illustrates a perspective view of a bucket with the assembled panels inserted therein.

DESCRIPTION OF THE PREFERRED EMBODIMENT(S)

Figure 1:
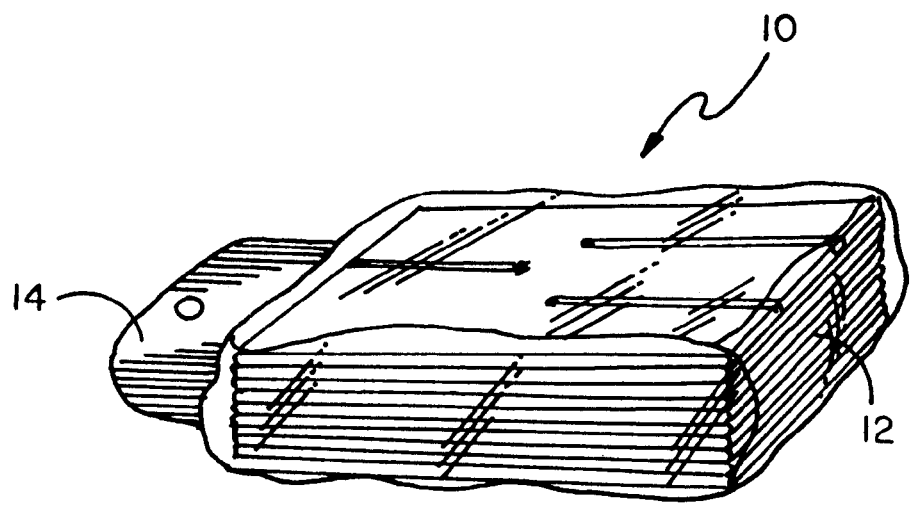
FIG. 1 illustrates a perspective view of the kit of this invention consisting of a plurality of panels held within a bag-like container.
Figure 3:
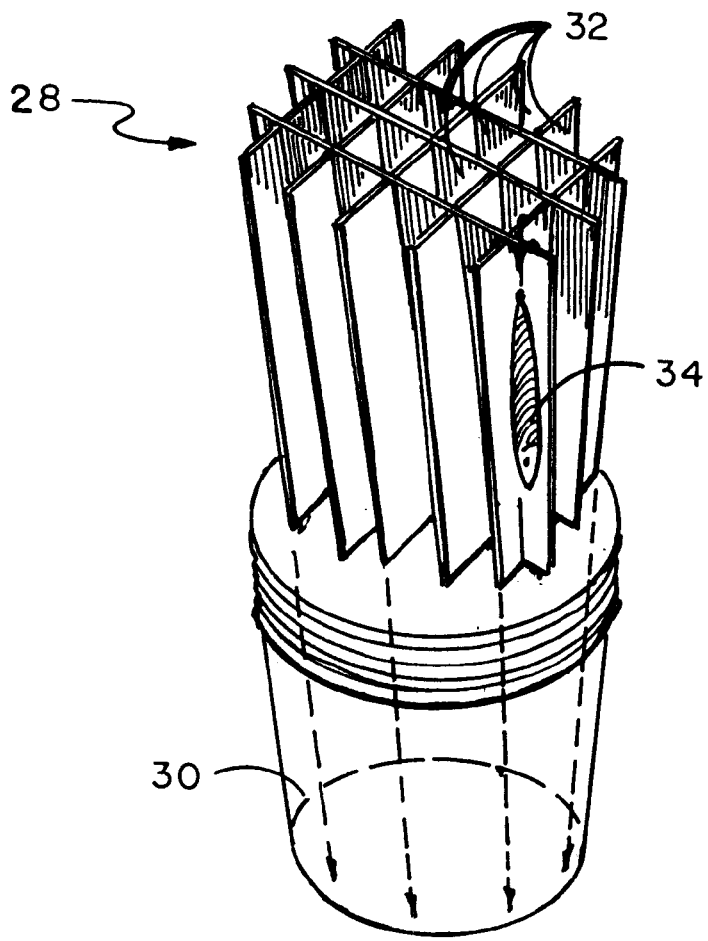
FIG. 3 illustrates a perspective view of the panels about to be assembled for insertion into a bucket.

FIG. 1 illustrates a perspective view of kit 10 of this invention with the eight panels described further below held within bag 12 or other type of containment means. Bag 12 can have a hang tab 14 at one end thereof or other equivalent well-known structure so that the kit can be hung on a display rack at the point of sale. The kit in a preferred embodiment is made up of eight panels having slots defined therein, as seen in FIG. 2, which panels are interengaged with one another as described below. A center panel 20 which in area is shaped to be of a size to fit snugly within the central area of bucket 30, as seen in FIGS. 3 and 4, such that its sides taper inward from top to bottom at a slope consistent with that of the inward slope of the sides of the bucket. Central panel 20 has five upper slots 26A, 26B, 26C, 26D, and 26E defined in its upper portion extending from its top vertically downward at approximately one half the height of the panel with each slot generally spaced equidistant from one another. Within upper slots 26A–26E in center panel 20 are engagingly slid bottom slots 25A–25E, respectively, formed in the bottom of each of the five side panels 16A–16E such that as each bottom slot 25A–25E engages center panel 20 below the end of its respective upper slot 26A–26E, each side panel 16A–16E will be substantially disposed at right angles to center panel 20. The side panels have different widths with the widest disposed within the central upper slot 26C of the center panel 20 and the two narrowest disposed in outer slots 26A and 26E of center panel 20. Side panels 16A–16E are of a width so as to also fit snugly within bucket 30 with a taper along their outer sides to conform with the inward taper of bucket 30. Slots 26A–26E can extend approximately halfway down center panel 20, and slots 25A and 25B can extend up approximately halfway within the side panels so as to allow for the alignment and retention of each side panel by the sides of the respective slots 26A–26E of center panel 20 and of the retention of bottom slots 25 against the body of center panel 20. Once the side panels have been inserted within their respective slots within center panel 20 and the tops of the side panels have been aligned with the top of the center panel, the structure is further strengthened by the insertion of the first and second lateral panels 18A and 18B which have upward extending slots in their bottoms such as slots 24A–24E in first lateral panel 18A and slots 23A–23E in second lateral panel 18B which are disposed to align with the downward extending upper slots 22A and 22B in each of the side panels 16A and 16E, respectively, such that slot 24A will align and engage with slot 22B of first side panel 16A while slot 24B will align, and engage with slot 22B of second side panel 16B, and so on. Upper slots 22A and 22B of side panels 16A–16E extend down a distance approximately half the height of the side panels, and slots 24A–24E and 23A–23E extend upwards from the bottom, respectively, of the first and second panels 18A and 18B approximately half the height of the panels such that when all of the panels are interengaged with one another, their tops are aligned and form a structure that is generally tapered and is approximately the same size and shape as the interior of bucket 30 and when inserted therein, as seen in FIGS. 3 and 4, form a plurality of openings 32 in which desired fishing gear such as fishing lure 34, shown in FIG. 3, can be positioned extending down the length of opening 32 and retained at the top thereof by the hook at the end of the fishing lure. Finger apertures such as apertures 42 seen in FIG. 2 can be formed in center panel 20 for ease in grasping and lifting out, or lowering, panel array 28. A cover 52 can be placed on top of bucket 30 above panel array 28 after it has been assembled and inserted into the bucket which cover can further be utilized as seat 50, if desired. The panel structure of the kit of this invention can be disassembled for storage, if desired, and is inexpensive enough to be disposed of should it become foul-smelling after extensive usage. The panels can be of a thickness of approximately ⅛ inch and can be constructed of cardboard-like material, Masonite-type fiberboard, plastic or other material that is not substantially affected by wetness. It should be further noted that other panels forming other interlocking arrangements of open apertures can also be utilized and fall within the spirit and scope of this invention. It should also be noted that the number of panels provided in the kit of this invention can vary from the eight panels discussed above and still fall within the scope and spirit of this invention.

Although the present invention has been described with reference to particular embodiments, it will be apparent to those skilled in the art that variations and modifications can be substituted therefor without departing from the principles and spirit of the invention.

I claim:

1. A structure for use in a bucket for storage of objects, comprising:

a plurality of interengaging panels for insertion within said bucket, said interengaging panels defining a plurality of openings between said panels for receipt of said objects therein wherein said panels include a center panel having a top and a plurality of slots vertically defined therein extending downward from said top;

a pair of lateral panels, each having a top and a bottom, disposed one on each side of said center panel, said lateral panels each having a plurality of slots defined in the bottom thereof extending vertically upward; and a plurality of side panels each having a top and bottom, said tops having a pair of upper slots extending vertically downward defined in said tops thereof, said side panels adapted to engage said first and second lateral panels, respectively, and said bottom having a plurality of bottom slots defined respectively therein adapted to engage said plurality of slots in said center panel such that said panels when assembled form a panel array structure having a plurality of upper facing rectangular openings, said assembled panel array structure for inserting in said bucket, said openings forming a plurality of compartments each having an open top for receipt of objects to be stored therein.

2. The structure of claim 1 wherein said center panel has at least one aperture defined in the top thereof for easy grasping and lifting and lowering of said panel array structure into and out of said bucket.

3. A kit for the conversion of a bucket into a storage container, comprising:

a plurality of panels having slots defined therein for interengagement with one another forming a plurality of upward opening apertures defined between said panels when said panels are inserted into a bucket, said disassembled panels grouped together and provided as a kit wherein said panels include a center panel having a top and a plurality of slots vertically defined therein extending downward from said top;

a pair of lateral panels, each having a top and a bottom, disposed one on each side of said center panel, said lateral panels each having a plurality of slots defined in the bottom thereof extending vertically upward; and a plurality of side panels each having a top and bottom, said tops having a pair of upper slots extending vertically downward defined in said tops thereof, said side panels adapted to engage said first and second lateral panels, respectively, and said bottom having a plurality of bottom slots defined respectively therein adapted to engage said plurality of slots in said center panel such that said panels when assembled form a panel array structure having a plurality of upper facing rectangular openings, said assembled panel array structure for inserting in said bucket, said openings forming a plurality of compartments each having an open top for receipt of objects to be stored therein.

4. The kit of claim 3 wherein said center panel has at least one aperture defined in the top thereof for easy grasping and lifting and lowering of said panel array structure into and out of said bucket.

\* \* \* \* \*